United States Patent
Workman

(10) Patent No.: US 9,498,843 B2
(45) Date of Patent: Nov. 22, 2016

(54) SYSTEM FOR PREVENTING THE FORMATION OF MARTENSITE IN METALS JOINING APPLICATIONS

(71) Applicant: EDISON WELDING INSTITUTE, INC., Columbus, OH (US)

(72) Inventor: David P. Workman, Dublin, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 85 days.

(21) Appl. No.: 14/564,598

(22) Filed: Dec. 9, 2014

(65) Prior Publication Data

US 2015/0090772 A1 Apr. 2, 2015

Related U.S. Application Data

(63) Continuation of application No. 13/733,273, filed on Jan. 3, 2013, now abandoned.

(60) Provisional application No. 61/697,675, filed on Sep. 6, 2012.

(51) Int. Cl.
*B23K 20/12* (2006.01)
*B23K 20/227* (2006.01)

(52) U.S. Cl.
CPC ......... *B23K 20/227* (2013.01); *B23K 20/1205* (2013.01); *B23K 20/129* (2013.01); *B23K 2201/26* (2013.01)

(58) Field of Classification Search
USPC ................ 228/2.1, 112.1, 2.3, 113
See application file for complete search history.

(56) References Cited

U.S. PATENT DOCUMENTS

| | | | | |
|---|---|---|---|---|
| 2,276,823 A | * | 3/1942 | Cadwell | B60M 5/00 164/54 |
| 2,401,048 A | * | 5/1946 | Cadwell | C22B 5/06 164/335 |
| 3,180,970 A | * | 4/1965 | Gilson | B23K 9/038 219/137 R |
| 4,179,067 A | * | 12/1979 | Baier | E01B 3/34 238/283 |
| 5,161,891 A | * | 11/1992 | Austill | G01B 5/30 33/1 Q |
| 5,449,116 A | * | 9/1995 | Bruning | B60M 1/302 238/10 E |
| 2003/0209591 A1 | * | 11/2003 | Wada | B23K 23/00 228/257 |
| 2007/0194143 A1 | * | 8/2007 | Palermo | A63H 19/24 238/10 R |

FOREIGN PATENT DOCUMENTS

| | | | |
|---|---|---|---|
| CN | 201618914 U | * | 11/2010 |
| CN | 102534403 A | * | 7/2012 |

* cited by examiner

*Primary Examiner* — Devang R Patel
(74) *Attorney, Agent, or Firm* — McNees Wallace & Nurick, LLC

(57) ABSTRACT

A method for joining materials such as metal alloys that includes a first component, wherein the first component includes a first alloy having a known austenization temperature below which martensite forms when the component is heated and then cooled at a predetermined rate of cooling; a second component, wherein the second component includes a second alloy; and a welding apparatus operative to create a weld between the first and second components without crossing the austenization temperature of the first alloy.

15 Claims, 4 Drawing Sheets

SYSTEM FOR PREVENTING THE FORMATION OF MARTENSITE IN METALS JOINING APPLICATIONS

CROSS-REFERENCE TO RELATED APPLICATIONS

This patent application is a continuation of U.S. patent application Ser. No. 13/733,273 filed on Jan. 3, 2013 and entitled "System for Preventing the Formation of Martensite in Metals Joining Applications", which claimed the benefit of U.S. Provisional Patent Application Ser. No. 61/697,675 filed on Sep. 6, 2012 and entitled "System and Method for Joining Materials," the disclosures of which are incorporated by reference for all purposes, as if fully rewritten herein.

STATEMENT REGARDING FEDERALLY FUNDED RESEARCH

This invention was supported in part by contract number DTFR53-12-C-00002 from the Federal Railroad Administration, Track Research Division. The U.S. Government has certain rights in the invention.

BACKGROUND OF THE INVENTION

The present invention relates generally to a system and method for joining two components to one another, particularly where one of the two components is a hardened metal, and more specifically to a system and method for attaching a stud or other appurtenance to a specific location on a length of steel rail for the purpose of attaching a signal wire to the stud.

Railroad signaling systems are essential for enabling safe and efficient movement of rail traffic. Many modern railroad signal systems employ a track circuit to detect the presence of a train within a section of track known as a signal block. The basic principle behind the track circuit involves the connection of the two rails by the wheels and axle of locomotives to short out an electrical circuit. This circuit is monitored by electrical equipment to detect the absence of the trains. An integral part of the track circuit is the two parallel running rails on which a train runs. Various types of signal devices are typically connected to these rails to complete the track circuit. Known techniques for connecting a wire to a rail include exothermic welding processes where the wire is welded to the rail. Other techniques include compressing a metal sleeve including the wire in a hole drilled in the rail or clamping a wire directly to the rail. Many signaling system incidents are known to be caused by failures at the rail-wire interface, where track wires, bond wires, or propulsion-current bond wires are attached to the rails to provide an electrical path for controlling train control signals. These failures contribute to train delays and additional maintenance costs for emergency and unplanned repairs and are highly undesirable for these and other reasons.

As indicated above, signal wires are attached to rails to allow for positive train control and to sense breaks in the rails for avoiding accidents. A reliable signal wire-to-rail connection is essential for signal system functionality and failures cause service disruptions and can affect the integrity of the rail, leading to rail failure. Currently used methods for attaching a signal wire to a length of track involve the use of an appurtenance or stud that is attached directly to the rail. The signal wire is then attached or connected to the stud. Common attachment methodologies include brazing, soldering, drilling, and/or clamping the stud/wire to the rail. Many brazing methods require preheating the rail section to which the stud will be attached and then precisely controlling the rate of cooling to avoid the undesirable formation of untempered martensite in the rail. With brazing methodologies there is also the risk of liquid metal embrittlement as the rail is under tensile stress to maintain neutral temperature and a liquid metal is present during the process. Accordingly, it is a common precautionary practice to locate the studs at the neutral axis of the rail due to the possible formation of a brittle layer around the joint caused by overheating of the stud/wire to rail connection point. The placement of welds/braze joints on the head of the rail is known to have resulted in the formation of martensite in the head of the rail, which initiated cracks that led to several train derailments; thus the neutral axis is generally safer from a catastrophic failure perspective. However, placement at this location makes the wire harnesses susceptible to snagging by maintenance equipment and the formation of martensite in this area may still lead to cracking and rail failure. Furthermore, most known attachment methodologies require a degree of operator skill, the absence of which may result in inconsistent or incorrect installations and ultimately in failure of the stud/wire connection, particularly in mass production. Thus, there is an ongoing need for an improved system and method for attaching a stud or appurtenance to a specific location on a length of steel rail.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first system and method for joining materials is provided. This system includes a first component, wherein the first component includes a first alloy having a known austenization temperature below which martensite forms when the component is heated and then cooled at a predetermined rate of cooling; a second component, wherein the second component includes a second alloy; and a welding apparatus operative to create a weld between the first and second components without crossing the austenization temperature of the first alloy.

In accordance with another aspect of the present invention, a second system and method for joining materials is provided. This system includes a first component, wherein the first component includes a first alloy having a known austenization temperature below which martensite forms when the component is heated and then cooled at a predetermined rate of cooling; a second component, wherein the second component includes at least one low-sulfur, low-lead alloy; and a welding apparatus operative to create a weld between the first and second components without crossing the austenization temperature of the first alloy.

In yet another aspect of this invention, a third system and method for joining materials is provided. This system includes a first component, wherein the first component includes a first alloy having a known austenization temperature below which martensite forms when the component is heated and then cooled at a predetermined rate of cooling, wherein the first component further includes heat-treated steel, and wherein the first component is a length of train rail; a second component, wherein the second component includes at least one low-sulfur, low-lead alloy, wherein the second component further includes an appurtenance that is operative to provide a surface to which a signal wire or other device may be attached, and wherein the appurtenance is a stud, bolt, or block; and a welding apparatus operative to create a weld between the first and second components without crossing the austenization temperature of the first alloy, wherein the welding apparatus is operative to perform solid-state welding, and wherein the welding apparatus is an inertia friction welding machine.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE FIGURES

The accompanying images, which are incorporated into and form a part of the specification, illustrate one or more exemplary embodiments of the invention and serve to explain the principles of the invention, and wherein.

DESCRIPTION OF THE INVENTION

Figure 1:
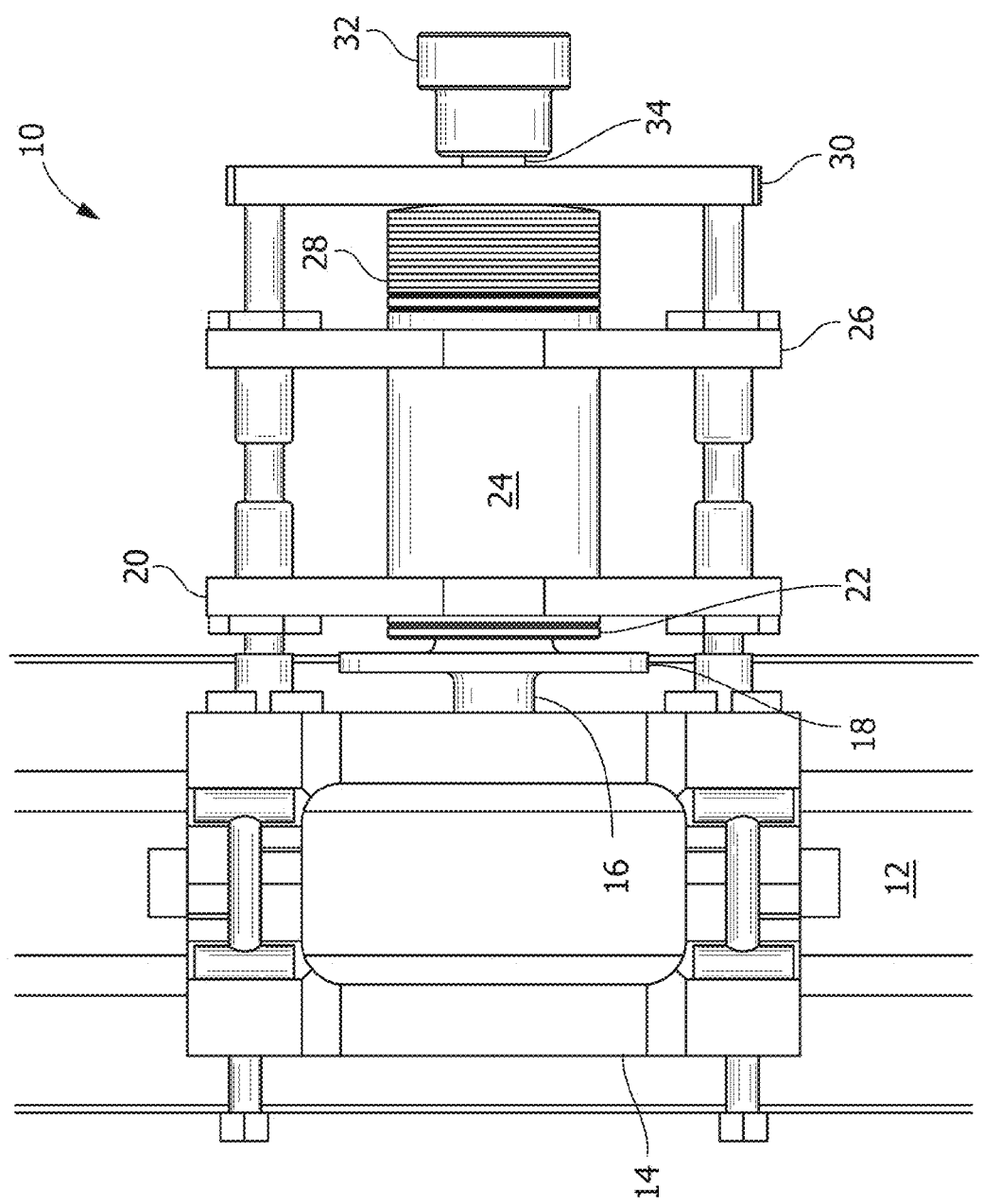
FIG. 1 is a side view of a portable inertia friction welder mounted on a length of rail in accordance with an exemplary embodiment of this invention.

Certain exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated, the present invention relates generally to a system and method for joining two components to one another, particularly where one of the two components is a hardened metal, and more specifically to a system and method for attaching a stud or appurtenance to a specific location on a length of steel rail for the purpose of attaching a signal wire to the stud. The system and method of this invention have applicability beyond use with rails and signal wires because the process can also be used to attach appurtenances to hardenable materials without negatively affecting the underlying material properties. For example, attaching a bolt on location to a hardened cutting surface that is heat treated would be possible without deleterious effects to the pre-hardened material. Essentially, the system and method of this invention may be used for any number of applications that require the attachment of one metal component to another metal component wherein the use of more traditional joining or welding techniques would potentially damage the substrate metal. Using the system and method of this invention, the risk of liquid metal embrittlement and martensite formation are substantially eliminated because there is no melting of a stud or braze material to infiltrated the grain boundaries in the steel and the welding temperature is kept below the critical transformation temperature of hardened steel. Various exemplary embodiments of this invention are described in greater detail below.

The present invention typically includes two or more metal components that are joined together using a welding technique that avoids damaging either component during the joining process. In one exemplary embodiment, the first component is a length of hardened steel rail used for train track. Modern track typically uses hot rolled steel with a profile of an asymmetrical rounded I-beam. Unlike some other uses of iron and steel, railway rails are subject to very high stresses and are typically made of very high-quality steel alloy. Attachment of an appurtenance to heat-treated steel is typically very difficult due the nature of this alloy. The second component is a lower-strength appurtenance such as a stud to which signal wire is or will be attached. This stud is joined to the steel rail at a desired location using a welding process, such as friction welding, which prevents the occurrence of liquid metal embrittlement in the rail alloy. Friction welding is a solid-state welding process that generates heat through mechanical friction between a moving workpiece and a stationary component, with the addition of a lateral force called "upset" to plastically displace and fuse the materials. The combination of fast joining times (on the order of a few seconds), and direct heat input at the weld interface, yields relatively small heat-affected zones. Friction welding techniques are generally melt-free, which avoids grain growth in engineered materials, such as high-strength, heat-treated steels. Another advantage of friction welding is that it allows dissimilar materials to be joined to one another. Normally, the wide difference in melting points of two dissimilar materials would make it nearly impossible to weld using traditional techniques, and would require some sort of mechanical connection. Friction welding provides a "full strength" bond with no additional weight.

With regard to a steel rail component, the system and method of the present invention produces a weld on rail steel without crossing the known austenitization temperature for such steel, thereby avoiding the need for tempering post weld or controlled cooling to avoid martensite formation. Austenitization involves heating iron, an iron-based metal, or steel to a temperature at which it changes crystal structure from ferrite to austenite. Martensite refers to a very hard form of steel crystalline structure and is formed by rapid cooling (quenching) of austenite which traps carbon atoms that do not have time to diffuse out of the crystal structure. This martensitic reaction begins during cooling when the austenite reaches a known martensite start temperature and the parent austenite becomes mechanically unstable. Since quenching can be difficult to control, many steels are quenched to produce an overabundance of martensite and then tempered to gradually reduce its concentration until the right structure for the intended application is achieved. Too much martensite leaves steel brittle, too little leaves it soft. With regard to an appurtenance or stud component, certain materials (e.g., low-sulfur, low-lead alloys) exhibit highly desirable characteristics, which permit friction welding of the stud to the rail without a temperature in excess of the austenitization temperature of the rail or steel without demanding thrust loads that are too high for a portable inertia welding system. The use of a hexagonal shaped stud with a circular face minimizes machining cost for the stud and provides wrench flats during in-service work.

One embodiment of this invention utilizes a portable battery-powered inertia friction welder that is mounted on a length of rail for low-energy input welding. The use of a low mass flywheel coupled with high surface velocity allows for a lightweight portable unit. The controls for speed and thrust load control are specific to the machine tool mounted to the rail. The use of a preloaded spring assembly or a precharged air or hydraulic cylinder provides weld force/thrust load in the portable system and a pin/ball release holds the thrust load on the spring. A lightweight clamp attaches the system to the head of the rail and a locator placed under the ball of the rail ensures repeatable placement on the rail regardless of wear condition. Location for the stud is dictated by reference to the under head radius region that transitions into the web of the rail. This configuration allows for reliable installation of studs with little operator influence on the process as all critical parameters are predetermined and mechanically controlled. As shown in FIG. 1, an exemplary embodiment of welding system 10 includes a length of rail 12 upon which restraining clamp 10 is mounted. Chuck 16 houses the stud (see FIGS. 2a-b) or other appurtenance, and flywheel 18 is connected to chuck 16. Front mount guide plate 20 supports bearing end plate 22, which is connected to bearing assemblies 24 which provide motor decouple and force engagement control. Rear mount guide plate supports bearing assemblies 24 and spring pack 28, which includes an air cylinder for providing thrust load. Motor coupler 32 is connected to drive shaft 34, which passes through back up plate 30 and connects with spring pack 28.

Figure 2A:
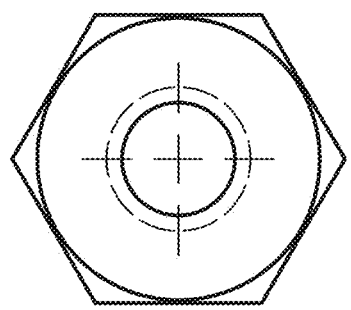
FIGS. 2a-b are front and side views respectively, of an exemplary stud or appurtenance suitable for mounting on the length of rail shown in FIG. 1.
Figure 2B:

In accordance with this invention, welds may be produced using an portable inertia friction welding machine such as that disclosed in U.S. Pat. No. 6,779,709 (Stotler et al.), which is incorporated by reference herein, in its entirety, for all purposes. The device disclosed in U.S. Pat. No. 6,779,709 is referred to as the m120 inertia friction welder and is a stationary programmable inertia friction welding machine that is capable of varying thrust load from 2000 lbs. to 24,000 lbs.; varying rotating mass from 1.21 wk$^2$ to 19 wK$^2$, and varying initial spindle speed from 300 to 13,000 RPM. This device typically uses collet type clamps to hold parts and or tooling in the headstock and tailstock. Additionally, surface velocity, thrust load, and inertia may be varied to control heat input. Suitable alloys for the appurtenance (i.e., stud) include low-sulfur, low-lead alloys generally and C464 Naval Brass, C172 Class 4 copper, C260 Brass, Muntz Metal (National Bronze and Metals, Houston, Tex.; Southern Copper, Pelham, Ala.) and Ni-12P braze alloy, specifically. Studs such as that shown in FIGS. 2a-b, can be made from ½-in hex stock to allow for easy torsion energy delivery and to simplify production. Weld strengths approached 6000 pounds for the hex parts welded which is roughly 35 ksi tensile strength or 50% of the cold worked C464 brass. With a hex stud design, a speed of 4000-4500 rpms, an inertial mass of 1.21 WK$^2$, and a thrust load of 5200-lbs force to 6000-lbs force may be employed with work hardened Naval Brass. FIGS. 1-2 show metallographic and SEM analysis conducted on weld joints to verify that no martensite was formed due to the fact that the critical temperature in the steel was not exceeded during welding. Pretinned studs or appurtenances with an alloy to create a solid state braze joint such as 50/50 Pb—Sn solder, are also compatible with this invention. As will be appreciated by one of ordinary skill in the art, the process of friction welding is scalable based on variables such as the surface area and mean diameter of the appurtenance (i.e., second component).

Figure 3:
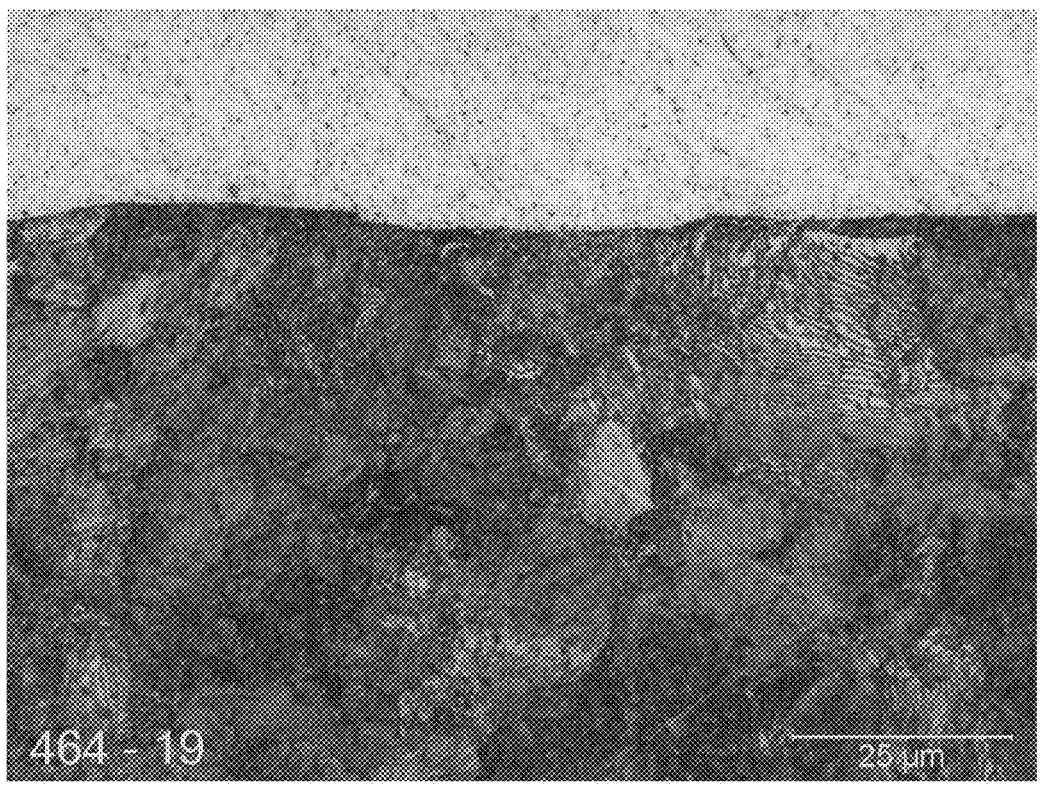
FIG. 3 provides a high-magnification metallurgical section of a weld joint created by the method of the present invention showing no apparent change to the underlying rail steel material.
Figure 4:
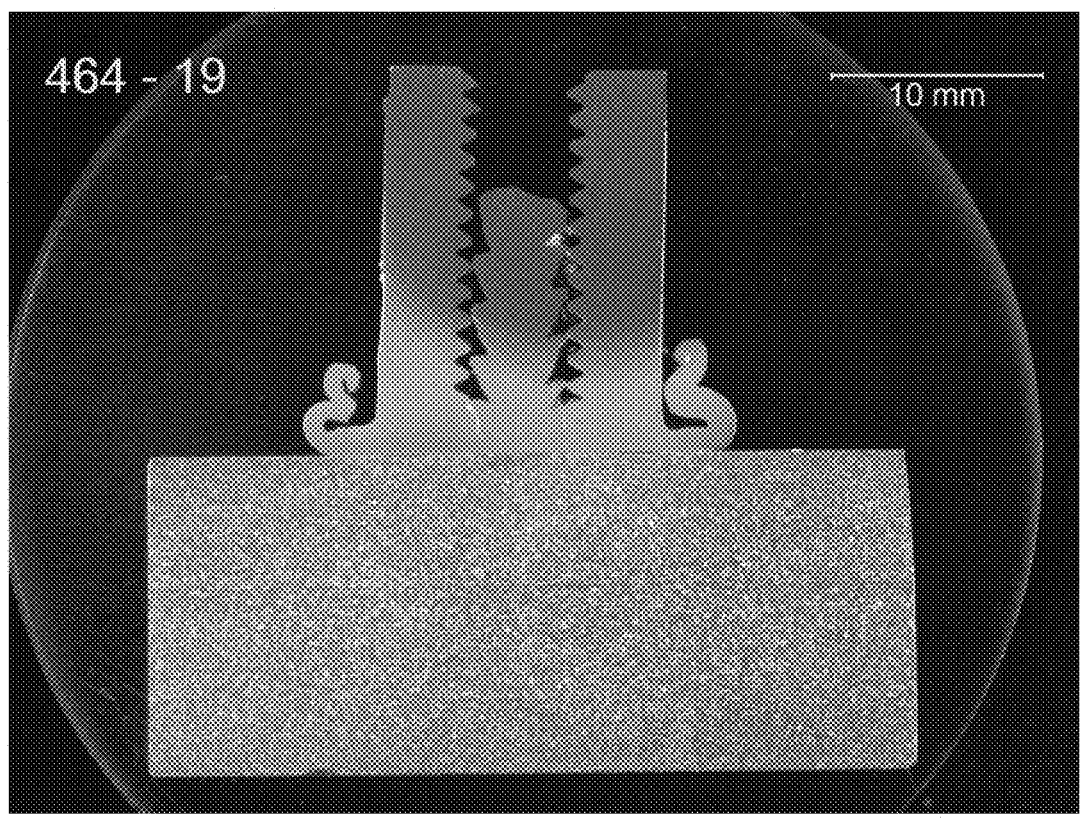
FIG. 4 provides a macro view of a weld stud mounted on rail material in accordance with the method of the present invention.

Advantageously, the present invention permits the installation of signal wires and studs on the head of the rail as no deleterious effects occur to the underlying rail material, i.e., brittleness and other weaknesses do no occur (see FIGS. 3-4). Currently, signal wires are located on the neutral axis of the rail making these connections susceptible to damage by maintenance equipment that snags and breaks studs and wiring located on the web neutral axis of the rail. Thus, the point of attachment may be moved from a low stress area to a critically loaded area (i.e., high stress area) without creating noticeable changes in the microstructure of the underlying alloy or problems with the integrity and strength of underlying substrate metal.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:
1. A method for joining materials, comprising:
(a) providing a first component, wherein the first component includes a first alloy having a known austenization temperature below which martensite forms when the component is heated and then cooled at a predetermined rate of cooling;
(b) providing a second component, wherein the second component includes a second alloy, and wherein the second component is a hex stud that further includes C464 brass; and
(c) utilizing a welding apparatus to create a weld between the first and second components without crossing the austenization temperature of the first alloy and forming martensite therein, wherein the welding apparatus is an inertia friction welding machine, and wherein the inertia friction welding machine operates at a speed of 4000-4500 rpms, an inertial mass of 1.21 WK$^2$, and a thrust load of about 5200-lbs force to 6000-lbs force.

2. The method of claim 1, wherein the first component further includes heat-treated steel.

3. The method of claim 1, wherein the first component is a length of train rail.

4. The method of claim 1, wherein the second component further includes an appurtenance, and wherein the appurtenance provides a surface to which a signal wire or other device may be attached.

5. The method of claim 4, wherein the appurtenance is a stud, bolt, or block.

6. The method claim 1, wherein the second component further includes at least one low-sulfur, low-lead alloy.

7. The method claim 1, wherein the second component further includes C172 Class 4 copper, C260 Brass, Muntz Metal, Ni-12P braze alloy, or combinations thereof.

8. The method of claim 1, wherein the welding apparatus performs solid-state welding.

9. A method for joining materials, comprising:
(a) providing a first component, wherein the first component includes a first alloy having a known austenization temperature below which martensite forms when the component is heated and then cooled at a predetermined rate of cooling;

(b) providing a second component, wherein the second component includes at least one low-sulfur, low-lead alloy, and wherein the second component is a hex stud that further includes C464 brass; and (c) utilizing a welding apparatus to create a weld between the first and second components without crossing the austenization temperature of the first alloy and forming martensite therein, wherein the welding apparatus performs solid-state welding, wherein the welding apparatus is an inertia friction welding machine, and wherein the inertia friction welding machine operates at a speed of 4000-4500 rpms, an inertial mass of 1.21 $WK^2$, and a thrust load of about 5200-lbs force to 6000-lbs force.

10. The method of claim 9, wherein the first component further includes heat-treated steel.

11. The method of claim 9, wherein the first component is a length of train rail.

12. The method of claim 9, wherein the second component further includes an appurtenance, wherein the appurtenance provides a surface to which a signal wire or other device may be attached, and wherein the appurtenance is a stud, bolt, or block.

13. The method claim 9, wherein the second component further includes C172 Class 4 copper, C260 Brass, Muntz Metal, Ni-12P braze alloy, or combinations thereof.

14. A method for joining materials, comprising:

(a) providing a first component, wherein the first component includes a first alloy having a known austenization temperature below which martensite forms when the component is heated and then cooled at a predetermined rate of cooling, wherein the first component further includes heat-treated steel, and wherein the first component is a length of train rail;

(b) providing a second component, wherein the second component includes at least one low-sulfur, low-lead alloy, wherein the second component further includes an appurtenance that provides a surface to which a signal wire or other device may be attached, and wherein the appurtenance is a stud, bolt, or block that further includes C464 brass; and (c) utilizing a welding apparatus to create a weld between the first and second components without crossing the austenization temperature of the first alloy and forming martensite therein, wherein the welding apparatus performs solid-state welding, and wherein the welding apparatus is an inertia friction welding machine, and wherein the inertia friction welding machine operates at a speed of 4000-4500 rpms, an inertial mass of 1.21 $WK^2$, and a thrust load of about 5200-lbs force to 6000-lbs force.

15. The method claim 14, wherein the second component further includes C172 Class 4 copper, C260 Brass, Muntz Metal, Ni-12P braze alloy, or combinations thereof.

* * * * *